United States

Conrad

[54] HIGH RESOLUTION SIX ELEMENT OBJECTIVE LENS

[72] Inventor: Lawrence H. Conrad, Maplewood, Minn.

[73] Assignee: Minnesota Mining and Manufacturing Company, St. Paul, Minn.

[22] Filed: Jan. 11, 1971

[21] Appl. No.: 105,459

[52] U.S. Cl. ............................................................. 350/222
[51] Int. Cl. .............................................................. G02b 9/42
[58] Field of Search ................................................... 350/222

[11] 3,649,102
[45] Mar. 14, 1972

[56] References Cited

UNITED STATES PATENTS

| 2,532,751 | 12/1950 | Baker | 350/222 |
| 3,384,435 | 5/1968 | Schade et al. | 350/222 X |

*Primary Examiner*—John K. Corbin
*Attorney*—Kinney, Alexander, Sell, Steldt & Delahunt

[57] ABSTRACT

A six element $f/4.5$ 24X magnification Double Gauss objective lens comprising from front to rear a positive meniscus lens element, a cemented doublet consisting of a positive meniscus lens and a negative meniscus lens element, a second cemented doublet consisting of a biconcave lens element and a biconvex lens element, and a plano-convex lens element.

1 Claim, 9 Drawing Figures

Patented March 14, 1972

3,649,102

2 Sheets-Sheet 1

INVENTOR.
LAWRENCE H. CONRAD
BY Kinney, Alexander,
Sell, Steldt & De La Hunt
ATTORNEYS INVENTOR.
LAWRENCE H. CONRAD
BY Kinney, Alexander,
Sell, Steldt & DeLaHunt
ATTORNEYS

HIGH RESOLUTION SIX ELEMENT OBJECTIVE LENS

The present invention relates to a high resolution six-element objective lens of the Double Gauss form particularly adapted for use in microphotography.

Microphotographic objective lenses must have high resolution and maximum contrast with minimum aberrations to provide acceptable results. To obtain high resolution, contrast and correction of the lens aberrations, prior art microphotographic objective lenses have generally consisted of a large number of lens elements without regard to cost as exemplified by the lens construction disclosed in U.S. Letters Pat. No. 3,450,463. Such lenses have, however, been unduly expensive because of the large number of lens elements as well as due to the expensive types of optical glass used.

According to the present invention there is provided a six-element lens which may be constructed of inexpensive optical glass, which is diffraction limited corrected, and which provides very high resolution and contrast as is desirable for microphotography. The lens comprises from front to rear a positive meniscus lens element, a cemented doublet consisting of a positive meniscus lens element and a negative meniscus lens element, a second cemented doublet consisting of a biconcave lens element and a biconvex lens element, and a planoconvex lens element.

Figure 1:
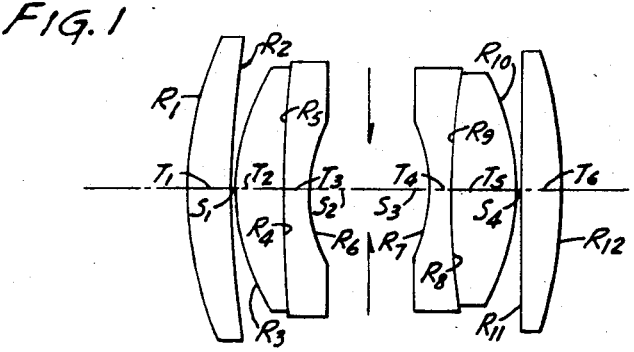
Figure 2:
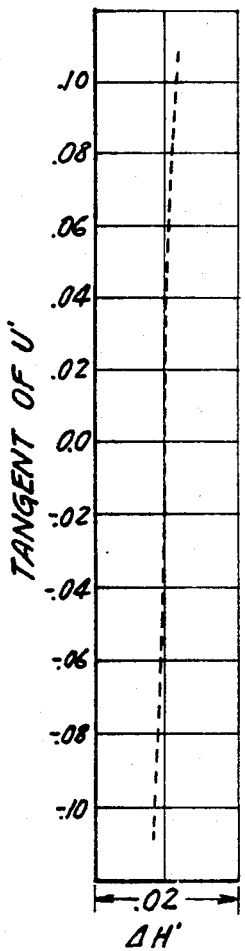
Figure 3:
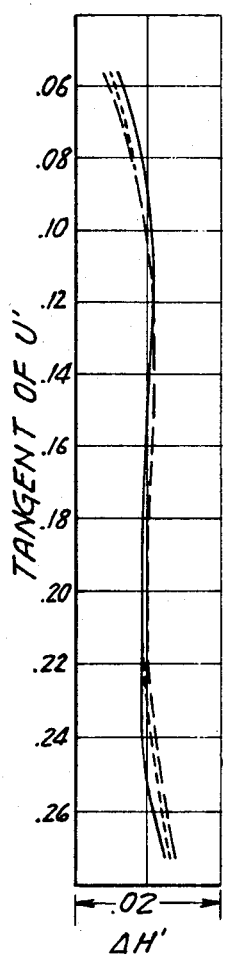
Figure 4:
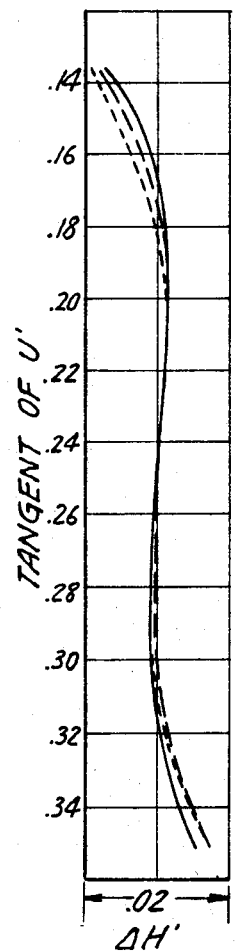
Figure 5:
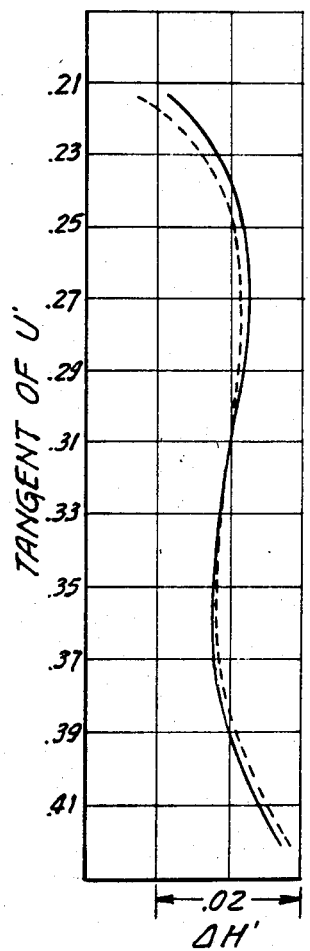
Figure 6:
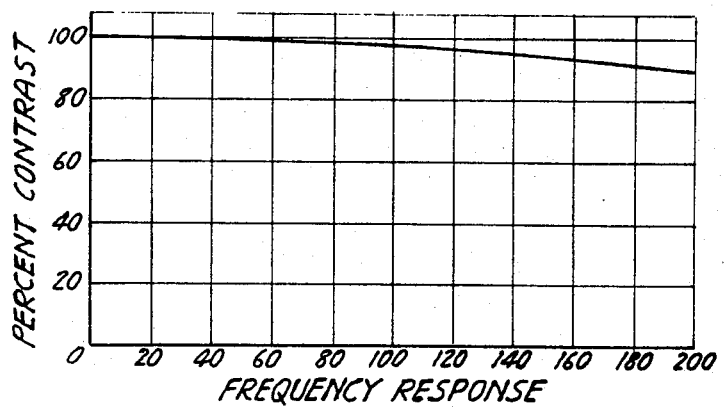
Figure 7:
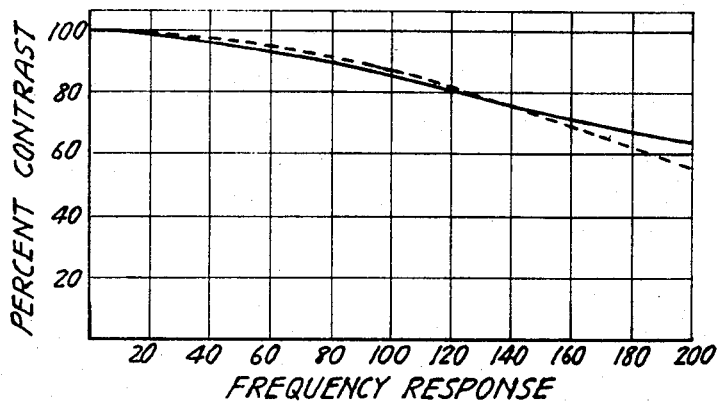
Figure 8:
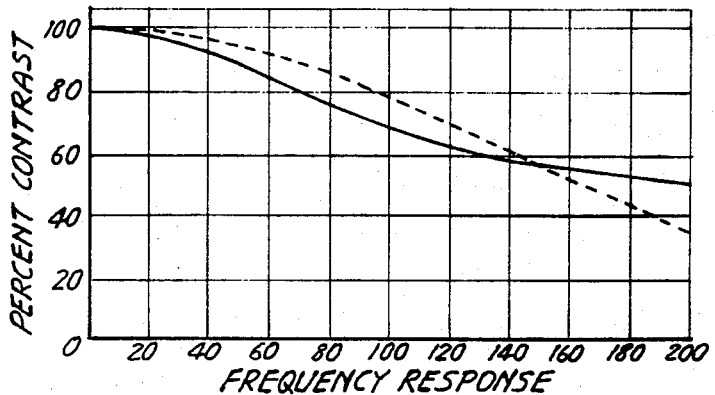
Figure 9:
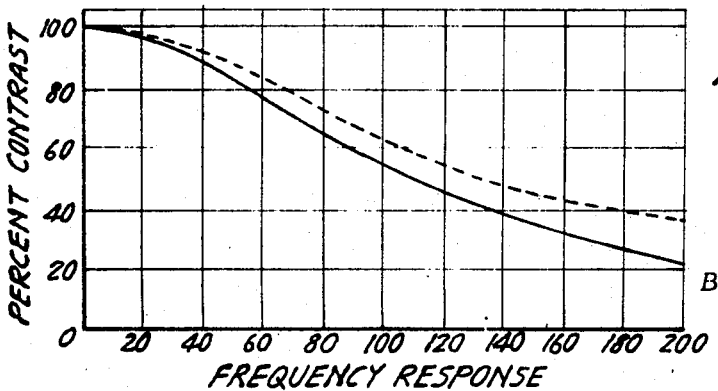

The novel features and advantages of the present invention will become apparent after reading the following description which refers to the accompanying drawings wherein:

FIG. 1 is a diagrammatic axial cross section of a lens constructed in accordance with the present invention;

FIGS. 2, 3, 4 and 5 are tangential oblique ray intercept curves along the lens axis and through 50 percent, 75 percent and 100 percent respectively of its field of view;

FIGS. 6, 7, 8 and 9 are modulation transfer function traces along the lens axis and through 50 percent, 75 percent and 100 percent respectively of its field of view.

The microphotographic objective lens of the present invention comprises from front to rear a positive meniscus lens element 1, a cemented doublet consisting of a pair of concavo-convex lens elements 2 and 3, a second cemented doublet consisting of a biconcave lens element 4 and a biconvex lens element 5, and a planoconvex lens element 6. A diaphragm or aperture stop is located between lens elements 3 and 4.

Numerical data for constructing an objective lens according to the invention as outlined above is given in the following table in which the lens elements are numbered from front to rear, N is the index of refraction of the lens elements for the D line, V is the index of dispersion, and R, T and S refer respectively, to the radii of curvature of the lens surfaces, the thickness of the lens elements and the airspaces between the elements, numbered by subscript from front to rear.

Equivalent focal length = 17.22 mm.     f/4.5

| Element | $N_D$ | V | Radii (mm.) | Thicknesses and Spacings (mm.) |
|---|---|---|---|---|
| 1 | 1.670 | 47.2 | $R_1 = +9.745$ | $t_1 = 1.39$ |
|   |       |      | $R_2 = +31.574$ | $s_1 = 0.10$ |
| 2 | 1.691 | 54.8 | $R_3 = +6.244$ | $t_2 = 1.41$ |
|   |       |      | $R_4 = +43.45$ |              |
| 3 | 1.664 | 35.8 | $R_5 = +43.45$ | $t_3 = 0.75$ |
|   |       |      | $R_6 = +4.133$ |              |
| STOP |    |      |                | $s_2 = 1.75$ |
|      |     |      |                | $s_3 = 1.75$ |
| 5 | 1.636 | 35.3 | $R_7 = -5.029$ | $t_4 = 0.70$ |
|   |       |      | $R_8 = +19.36$ |              |
| 5 | 1.658 | 57.2 | $R_9 = +19.36$ | $t_5 = 1.88$ |
|   |       |      | $R_{10} = -6.928$ |           |
|   |       |      |                | $s_4 = 0.05$ |
|   |       |      | $R_{11} = \infty$ |           |
| 6 | 1.720 | 42.0 |                | $t_6 = 1.18$ |
|   |       |      | $R_{12} = -13.134$ |         |

A lens constructed in accordance with the above specification has a 24X magnification, a front focal length of 9.71 mm., a back focal length of 11.79 mm. and less than 0.2 percent distortion. The lens produces a light cone having a 23° half angle and an effective image cone having a 19° half angle. This large an effective image cone is not obtainable with fewer than six lens elements and it is desirable in that in a fixed image to object distance it permits larger image areas to be recorded. Furthermore, this lens has at least a 0.05 mm. depth of focus which is an unusually good depth of focusing ability for any lens. From the above table it can be seen that the indices of refraction for the Sodium "D" line for all of the lens elements are between 1.636 and 1.720. Thus, all of the lens elements may be constructed of inexpensive optical glass.

The graphs of FIGS. 2 through 5 illustrate tangential-oblique ray intercept curves along the axis and through 50 percent, 75 percent and 100 percent of the field of view. The full lines represent the tangential-oblique ray intercept curves for the Sodium "D" line while the long segment broken lines and the short segment broken lines, respectively, represent the curves for the Hydrogen "F" and "C" lines. In the graphs of FIGS. 2 through 5 U' is the refracted ray convergence angle and $\Delta H'$ is the deviation in millimeters in the ray intercept height in the image plane where H', the ray intercept height in the image plane, is 6.342 millimeters at 100 percent of field. It can readily be seen from the magnitude of the scale expansion for $\Delta H'$ and from the fact that these curves are still nearly straight vertical lines, that a lens constructed in accordance with the present invention is extremely well corrected for spherical aberration and coma and produces very little, if any, curvature of field. The small distances between the curves for the Sodium "D" and the Hydrogen "C" and "F" lines show that the lens is extremely well corrected for chromatic aberrations.

In the graphs of FIGS. 6 through 9 the full lines represent the tangential ray modulation transfer function traces and the broken lines represent the sagittal ray modulation transfer function traces for the lens. The units of Frequency Response are line pairs per millimeter. These graphs are weighted so that the Sodium "D" line contributes 60 percent and the Hydrogen "C" and "F" lines each contribute 20 percent of the energy density. This color weighting has been found to most nearly produce a white light spectrum which is optimum for both color and black and white photography. The fact that the tangential ray and sagittal ray traces are close together shows that the lens is very well corrected for astigmatism. Furthermore, from these graphs it can be seen that the contrast is far above 10 percent (the threshold of visual acuity) even at a resolution of 200 line pairs per millimeter. The resolution, contrast and extremely well corrected aberrations provided by this lens construction, as well as its permissible low cost construction, makes it highly desirable for use in microphotography.

Although the invention has been described in detail with reference to a preferred embodiment thereof, it will be understood that minor variations and modifications can be effected without departing from the spirit and scope of the invention as described hereinabove.

What is claimed is:

1. A six-element objective lens comprising from front to rear a positive meniscus lens element, a cemented doublet consisting of a positive meniscus lens element and a negative meniscus lens element, a second cemented doublet consisting of a biconcave lens element and a biconvex lens element, and a planoconvex lens element, the lens elements having substantially the following characteristics and spacial relations in which the lens elements are numbered from the front, N is the index of refraction for the D line, V is the index of dispersion, and R, T and S refer respectively to the radii of curvature of the lens surfaces, the axial thickness of the lens elements, and the axial spacing between the lens elements, numbered by subscript from front to rear:

Thicknesses and

| Element | $N_D$ | V | Radii (mm.) | Spacings (mm.) |
|---|---|---|---|---|
| 1 | 1.670 | 47.2 | $R_1 = +9.745$ | $t_1 = 1.39$ |
|   |       |      | $R_2 = +31.574$ | $s_1 = 0.10$ |
| 2 | 1.691 | 54.8 | $R_3 = +6.244$ | $t_2 = 1.41$ |
|   |       |      | $R_4 = +43.45$ |  |
|   |       |      | $R_5 = +43.45$ |  |
| 3 | 1.664 | 35.8 |  | $t_3 = 0.75$ |
|   |       |      | $R_6 = +4.133$ | $s_2+s_3 = 3.50$ |
| 4 | 1.636 | 35.3 | $R_7 = -5.029$ | $t_4 = 0.70$ |
|   |       |      | $R_8 = +19.36$ |  |
|   |       |      | $R_9 = +19.36$ |  |
| 5 | 1.658 | 57.2 |  | $t_5 = 1.88$ |
|   |       |      | $R_{10} = -6.928$ | $s_4 = 0.05$ |
| 6 | 1.720 | 42.0 | $R_{11} = \infty$ | $t_6 = 1.18$ |
|   |       |      | $R_{12} = -13.134$ |  |

\* \* \* \* \*